United States Patent [19]
Li

[11] Patent Number: 5,881,199
[45] Date of Patent: Mar. 9, 1999

[54] OPTICAL BRANCHING DEVICE INTEGRATED WITH TUNABLE ATTENUATORS FOR SYSTEM GAIN/LOSS EQUALIZATION

[75] Inventor: Yuan P. Li, Duluth, Ga.

[73] Assignee: Lucent Technologies Inc., Murray Hill, N.J.

[21] Appl. No.: 759,281

[22] Filed: Dec. 2, 1996

[51] Int. Cl.$^6$ .............................. G02B 6/12; G02B 26/02
[52] U.S. Cl. ................... 385/140; 385/14; 385/24
[58] Field of Search ................... 385/14, 15, 24, 385/27, 29, 39, 47, 48, 140

[56] References Cited

U.S. PATENT DOCUMENTS

| | | | |
|---|---|---|---|
| 4,378,490 | 3/1983 | D'Auria Luigi | 250/201.1 |
| 4,711,790 | 12/1987 | Morishige | 427/10 |
| 4,740,050 | 4/1988 | Husain | 385/24 |
| 5,002,350 | 3/1991 | Dragone | 359/124 |
| 5,136,671 | 8/1992 | Dragone | 385/46 |
| 5,296,956 | 3/1994 | Fatehi et al. | 359/110 |
| 5,313,535 | 5/1994 | Williams | 385/14 |
| 5,412,744 | 5/1995 | Dragone | 385/24 |
| 5,502,781 | 3/1996 | Li et al. | 385/4 |
| 5,524,014 | 6/1996 | Kaminow et al. | 385/14 X |
| 5,694,512 | 12/1997 | Gonthier et al. | 385/140 |
| 5,745,271 | 4/1998 | Ford et al. | 385/140 X |

FOREIGN PATENT DOCUMENTS

| | | | |
|---|---|---|---|
| 0598966 | 6/1994 | European Pat. Off. | 385/140 |

OTHER PUBLICATIONS

Bridge–Suspended Silica–Waveguide Thero–Optic Phase Shifter and Its Application to Mach–Zehnder Type Optical Switch; The Transactions of the IEICE, Sugita, et al., Transactions of the IEICE, vol. E73, No. 1, Jan. 1990, pp. 105–109.

Eight–Channel Flat Spectral Response Arrayed–Waveguide Multiplexer with Asymmetrical Mach–Zander Filters; Okamoto, et al.; IEEE Photonics Technology Letters, vol. 8, No. 3, Mar. 1996, pp. 373–374.

16 ch Optical Add/Drop Mulitplexer using Silica–Based Arrayed–Waveguide Gratings (publication), Okamoto, et al. NTT Optoelectronics Laboratories, (1995), pp. 1–4, published in *OFC Technical Digest*—1995.

8 ×8 Optical Matrix Switch Using Silica–Based Planar Lightwave Circuits, Okuno, et al., IEICE Trans. Electron vol. E76–C, No. 7, Jul. 1993, pp. 1215–1223.

*Primary Examiner*—John D. Lee

[57] ABSTRACT

A dense waveguide division multiplexer (DWDM) is integrated on a single chip with a plurality of tunable attenuators that are connected in series to the output waveguides of the DWDM in order to equalize the power level on the output waveguides. In the preferred embodiment, the attenuators are thermo-optic Mach-Zehnder interferometer (TMZs) with a tunable range of 0 to 6 dB and a response time of approximately 1–10 milliseconds (ms). A heat sink is attached to the back of the chip to dissipate the heat from the TMZs and to reduce thermal crosstalk. In order to achieve a 3 dB loss on one of the output waveguides via the corresponding TMZ attenuator, approximately 0.25 W is required. In an alternative embodiment, the attenuators are variable stress Mach-Zehnder interferometers (VSMZs).

17 Claims, 3 Drawing Sheets

OPTICAL BRANCHING DEVICE INTEGRATED WITH TUNABLE ATTENUATORS FOR SYSTEM GAIN/LOSS EQUALIZATION

FIELD OF THE INVENTION

This invention generally relates to integrated optical devices in a fiber communication system and, more particularly, to a dense waveguide division multiplexer that is integrated with tunable attenuators on the same substrate for power equalization.

BACKGROUND OF THE INVENTION

In recent years, the use of fiberoptic networks for the distribution of long distance telecommunication services and local cable access television services has become widespread. In the future, all indications are that the use of fiberoptic networks will become even more prevalent as a preferred medium for transferring information as the marketplace for wide-bandwidth services matures. For instance, such services may include enhanced pay-per-view, video-on-demand, interactive television, interactive games, image networking, video conversing, video telephony, CATV, and ISDN switching services.

As the demand for fiberoptic circuit networks increase, development of new supporting technology and the refinement of existing technology is required for the evolution of the above identified services into reality for end-user subscribers. Several examples of devices representative of the technology developed for implementing fiberoptic networks are dense waveguide division multiplexers (DWDMs), fiber amplifiers such as erbium doped fiber amplifiers (EDFAs), and add/drop networks. As well known in the industry, each of the above devices, in addition to other components of a fiberoptic network, contribute to or are affected by power level variances in the different channels of a fiberoptic link.

For example, in a fiberoptic circuit with cascaded DWDMs and EDFAs, nonequal power levels in the different channels results in poor signal to noise ratio in the low power channels. This is of particular concern because the normal operation of a waveguide grating type DWDM, e.g., the one disclosed in U.S. Pat. No. 5,412,744, induces loss in the outermost channels, a phenomenon commonly referred to as roll-off. In an add-drop network, different channels are combined from different sources, typically having different fiber lengths, and therefore, the power levels on the different combined channels can vary drastically so as to be out of range of the system's tolerances. In an EDFA, the high powered channels saturate the amplifier and drain most of its power so that the channels having lower power are not adequately amplified. Consequently, fiberoptic circuits are presently being designed with more stringent requirements, particularly for devices such as transmitters which are designed to operate at specific power levels and receivers which are designed to have a specific range of sensitivity.

Accordingly, fiberoptic circuits include external attenuators for equalizing the power levels in the channels of a fiberoptic device so as to improve system performance and reliability. However, current configurations of attenuators utilized for power equalization leave much to be desired. First, the attenuators are typically stand alone devices that are incorporated in an optical circuit in a manner that requires one fiber to be coupled at the input of the attenuator and another fiber to be coupled at the output of the attenuator. This is undesirable because it complicates the circuit by the addition of another element which naturally increases the cost and subsequent maintenance of the circuit. Further, with stand alone attenuation of each optical channel, the system is also undesirably bulky.

Second, many of the attenuators in use today for power equalization are not adjustable, or if they are, they are mechanically adjusted. While adjustable (i.e., tunable), attenuators are desirable because they provide for greater control over system performance, the mechanical attenuators take approximately two to three seconds to adjust. This is undesirable because present optical transmission systems respond at near real-time speeds and any disruption of the communication system is very expensive, even if only for a second or two. The present inventor is currently not aware of any inexpensive fiber attenuators that provide real-time adjustment.

Thus, a need exists in the industry that has previously gone unsatisfied for a tunable attenuator that is suitable for integration on the same substrate with an optical device, such as a DWDM, and that can respond in real-time.

SUMMARY OF THE INVENTION

The present invention overcomes the inadequacies and deficiencies of the prior art as discussed hereinbefore and as well known in the industry. The present invention provides for a plurality of tunable attenuators that are integrated on a common substrate with an optical branching device and that are connected to the respective ports of the optical branching device. By integrating the tunable attenuators on a chip that already includes an optical branching device, the attenuators costs less and do not have the coupling loss associated with external attenuators. Further, the attenuation provided by the tunable attenuators can be controlled automatically so to remove the need for slower manual adjustments associated with the external attenuators that are mechanically tunable. An optical branching device is defined herein as any device that splits light into multiple output waveguides or ports, or in the reverse, that combines light from multiple input waveguides or ports. The optical branching device chosen for purposes of disclosing the present invention is a dense waveguide division multiplexer (DWDM) with a tunable attenuator in accordance with the present invention connected to one or more of its output waveguides.

In a preferred embodiment, the tunable attenuators are thermo-optic Mach-Zehnder interferometers (TMZs) with a tunable range of 6 decibels (dB) and a response time of approximately 10 milliseconds. While TMZs have previously been used as optical switches, the present invention represents the first use of TMZs as attenuators for system gain/loss equalization. Thus, whereas the extinction ratio and the power consumption are critical design concerns of a TMZ switch, a TMZ attenuator is not so concerned with the extinction ratio since the TMZ is functioning as an attenuator, nor is a TMZ attenuator so concerned with power consumption since the power required for attenuation is achievable at approximately half that required to actuate a TMZ switch.

In architecture, each TMZ comprises two 3 dB directional couplers interconnected by two waveguide arms of the same length. A thin film heater is formed over each arm so that one of the arms can be heated to create a temperature differential in between the arms, thereby causing a thermo-optic phase shift. This phase shift is based on the temperature dependence of the refractive index of the waveguide arms. By controlling the amount of heat applied, the resultant differential refractive index between the two arms causes a phase shift that induces a controllable loss in the combined signal at the output of the TMZ. Accordingly, one arm is made active and the other arm is made inactive, that is, one arm is heated while the other is not heated. Nonetheless, a thin film heater is formed over both arms to cancel the effect of stress imposed by the adhesion of the thin film heater over the waveguide arms. In order to prevent thermal crosstalk between the two waveguide arms of a TMZ, or that between two adjacent TMZs, it is preferred that the arms be separated by two to three times the total thickness of the waveguide layers (typically 30 micrometers ($\mu$m), and consisting of the lower cladding, core, and top cladding). In order to dissipate the heat generated by the active arm, the substrate is preferably a good thermal conductor (such as silicon), and a metal heat sink is attached to the underneath surface of the substrate.

Thus, the output waveguides of the DWDM that have an unacceptably high power level can have their power level adjusted by selectively and controllably actuating the amount of power applied to the heater of the TMZ associated with that waveguide so as to attenuate the waveguides power level into an acceptable range definable in accordance with system requirements.

In an alternative embodiment of the present invention, the tunable attenuators connected to the output waveguides of the DWDM are implemented with variable stress Mach-Zehnder interferometers (VSMZ) that utilize a piezo-electric transducer as the stress inducing medium. Thus, by applying a voltage to the piezo-electric transducer, the optical path length of the waveguide can be selectively and controllably modulated in order to attenuate the power level of the output waveguides.

In architecture, each VSMZ comprises two Y-junctions or 3 dB couplers interconnected by two waveguide arms of the same length. A piezo-electric transducer is formed near each of the arms though only one is active and the other is inactive. As with the TMZs, a piezo-electric transducer is formed near both arms to cancel the stress created by the adhesion of the transducer. Thus, when the transducer is actuated, the stress induced on the active arm alters the refractive index of the waveguide so as to cause a phase shift, much like the TMZ described above. The phase shift between the two arms causes attenuation in the combined signal at the second Y-junction. Thus, by controlling the stress induced on the active arm, the attenuation from the VSMZ can be precisely controlled.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

DETAILED DESCRIPTION OF THE PREFERRED EMBODIMENT

The following description is of the best presently contemplated mode of carrying out the present invention in context of a dense waveguide division multiplexer (DWDM) fabricated on a silicon-based chip using semiconductor technology. However, the present invention is equally well suited for integration on a chip with other optical branching devices which split and/or combine light, such as power splitters. In the present context, the DWDM is a Dragone router that has a tunable attenuator connected in series to each respective output waveguide of the Dragone router, and wherein the attenuators are fabricated on the same chip as the Dragone router utilizing the same (or a compatible) mass production technique. An example of a Dragone router can be found in U.S. Pat. No. 5,136,671 to C. Dragone, the disclosure of which is incorporated herein by reference. It should be noted, however, that one of ordinary skill in the art would readily appreciate that the present invention is equally applicable with other configurations of a DWDM, such as a multi-stage filter based on Fourier transforms or on wavelength comb-splitting.

Figure 1:
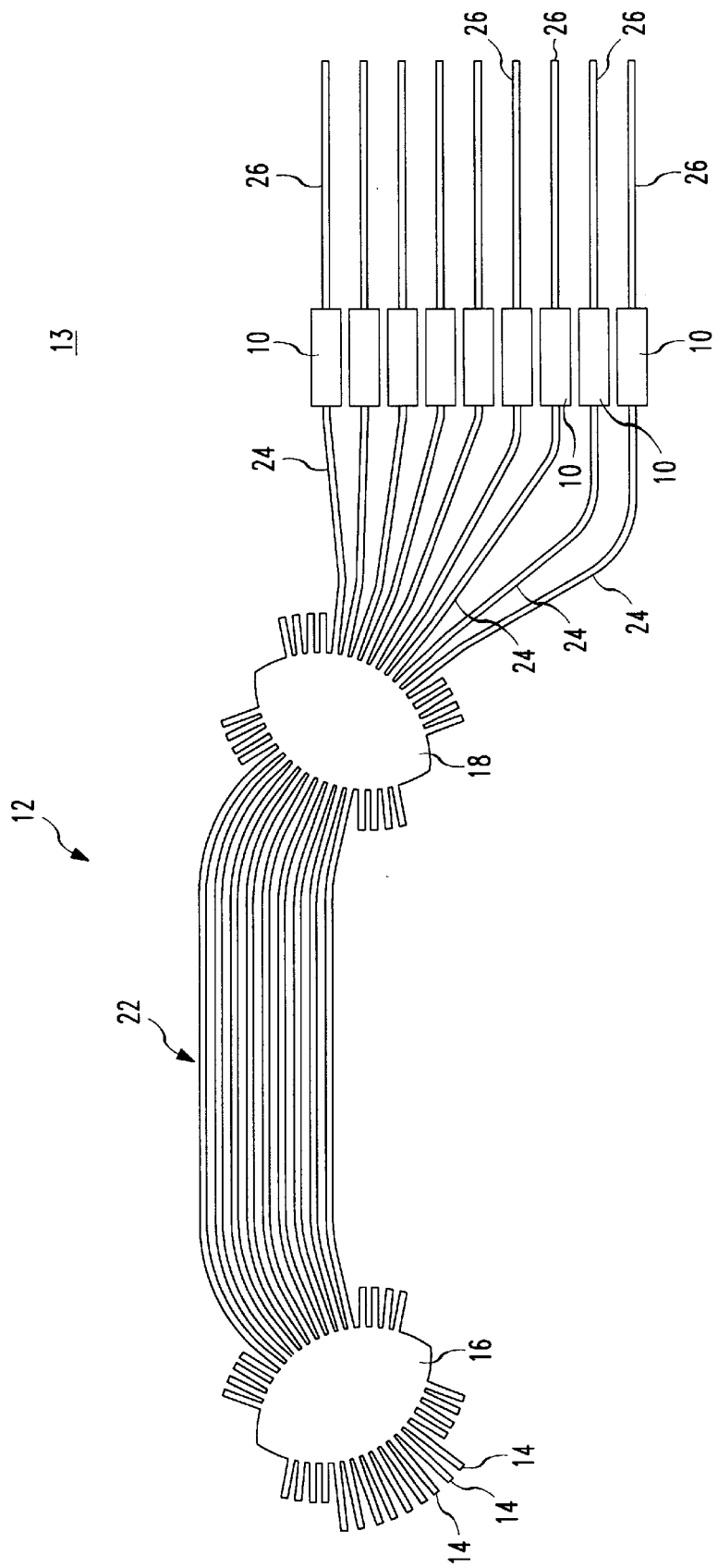
FIG. 1 is a top plan view of a dense waveguide division multiplexer integrated with a plurality of attenuators in accordance with the present invention.

With reference to the drawings, FIG. 1 illustrates the present invention wherein a plurality of tunable attenuators 10 are integrated with a DWDM 12 on a single substrate 13. In the preferred implementation, the DWDM 12 comprises a plurality of input waveguides 14 that are connected to a first free space region 16. A plurality of optical waveguides form an optical grading 22 interconnecting the first free space region 16 to a second free space region 18. A plurality of output waveguides 24 are also connected to second free space region 18. Connected in series to each output waveguide 24 is a tunable attenuator 10, as described in more detail below, for selectively and controllably attenuating the power level on the output waveguides 24 so as to provide power equalization. Preferably, the operation of the attenuators 10 is automated whereby receiving equipment detects the light signal in the waveguides and the waveguides that have unacceptably high power levels are identified. Then appropriate adjustments are communicated to the respective attenuators 10 associated with the waveguides having unacceptably high power levels so as to equalize the power levels in each of the wave guides. Alternatively, power-level monitoring equipment can be installed to detect the power level of the various waveguides for controlling the operation of the attenuators 10 in substantially the same manner. It is noted at this point that the control logic and associated hardware for measuring the various power levels and controlling the attenuators 10 would be obvious to one of ordinary skill in the art, and therefore, is not explained herein.

The DWDM 12 can be fabricated using any of a number of common planar waveguide fabrication techniques such as photo-lithography, RIE (reactive ion etching), CVD (chemical vapor deposition), or FHD (flame hydrolysis deposition).

As an example using silicon optical bench (SiOB) technology, a doped-silica waveguide is formed by initially depositing a base or lower cladding layer of low index silica on a silicon or silica substrate. A layer of doped silica with a high refractive index, i.e., the core layer, is then deposited on top of the lower cladding layer. The core layer is subsequently patterned or sculpted into a geometry required by the optical circuits using one of the above listed techniques. Lastly, a top cladding layer is deposited to cover the patterned waveguide core. This technology is described in more detail in, for example, U.S. Pat. No. 4,902,036, issued to L. H. Henry et al.

Figure 2:
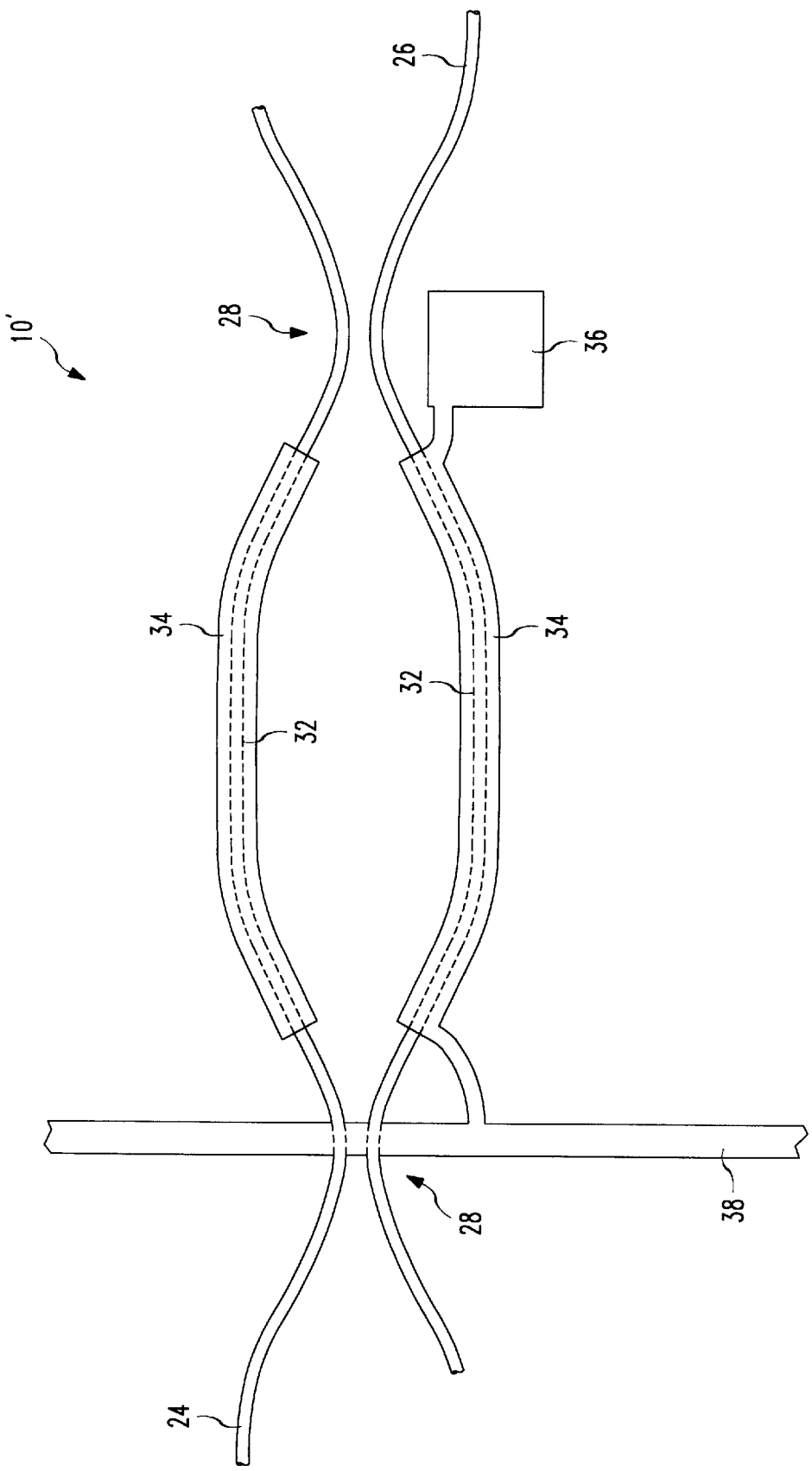
FIG. 2 is a top plan view of a thermo-optic Mach-Zehnder interferometer (TMZ) for implementation as a preferred embodiment of the attenuators of FIG. 1

A preferred embodiment of an attenuator for implementation as attenuators 10 in FIG. 1 is a four port TMZ 10', as illustrated in FIG. 2. The TMZ 10' is similar to the TMZ used in optical switching as is taught in Okuno et al.,, "8×8 Optical Matrix Switch Using Silica-Based Planar Lightwave Circuits, IEICE Trans. Electron., Vol. E76-c, No. 7 (July, 1993). However, the TMZ 10' operates as an attenuator rather than an optical switch, and therefore, uses less power in operation and does not require the high distinction ratio needed in a TMZ switch.

With reference to FIG. 2, the TMZ 10' includes two 3 dB directional couplers 28 that are interconnected by two waveguide arms 32 of the same length. Note that one or both of the 3 dB couplers 28 can be replaced by a Y-branch as would be recognized by one of ordinary skill in the art. The waveguide arms 32 generally should be between 4 and 10 millimeters (mm) in length in order to be of a size suitable for integration on the chip with the DWDM 12. For purposes of disclosing the present invention, the waveguide arms of the preferred embodiment are 8 mm in length. A thin film heater 34 is fabricated on the upper surface of the cladding material surrounding each of the waveguide arm 32. The thin film heaters are preferably 20 micrometers ($\mu$m) wide and approximately the same length as the waveguide arms, that is, 8 mm. One of the thin film heaters 34 is designated as active, meaning that an electric current will be applied to it for generating heat, whereas the other thin film heater 34 is designated as inactive, meaning that it will not have an electric current applied to it during operation of the TMZ 10'. Nonetheless, thin film heaters 34 are fabricated over both waveguide 32 in order to cancel the change in the refractive index of the respective waveguides 32 caused by the stress imposed by the fabrication of the metal films. Thus, by fabricating a thin film heater 34 over each waveguide arm, the change in the refractive index of each waveguide is the same and the unwanted phase shift is canceled.

The waveguide arms 34 are preferably separated by a distance (typically 100–200 $\mu$m) larger than two or three times the thickness of the waveguide layers (typically 30 $\mu$m) so that when the active arm is generating heat, the temperature of the inactive arm is unchanged. The conduction of heat from the active arm to the inactive arm is referred to as thermal crosstalk and is preferably kept to a minimum. The heat generated by the active arm can be further isolated from the other waveguide arm 32 by configuring the TMZ 10' as a bridge-suspended structure as taught in Sugita et al., "Bridge-Suspended Silica-Waveguide Thermo-Optical Phase Shifter and its Application to Mach-Zehnder Type Optical Switch," The Transaction of the IEICE, Vol. E73, No. 1 (January, 1990).

Another measure that can be taken to reduce the thermal crosstalk between the waveguide arms 32 is the use of a heat sink (not shown) mounted underneath the substrate 13 for dissipating the heat generated by the active thin film heater 34. The heat sink should be a piece of metal, such as copper or covar, that is highly heat conductive. Note that Covar also has a thermal expansion coefficient similar to silicon (Si), the material comprising the substrate, making it favorable for such use. Generally, the heat sink is soldered to the Si substrate using a special solder, such as gold-germanium (Au—Ge) alloy. The heat sink should be of a size to cover the area occupied by all the TMZs 10', and to extend and touch the case enclosing the chip so as to radiate the heat into the air.

A first electrode 36 is connected to one end of the active thin film heater 34 and a common electrode 38 is connected at the opposite end of the active thin film heater 34 for applying an electric current to the active thin film heater 34. Preferably, the common electrode 38 is shared by each of the TMZs 10' used to implement the attenuators 10 of FIG. 1. The common electrode 38 is preferably 1mm wide and of a length suitable for connecting to each attenuator 10 (See FIG. 1). The first electrode is preferably 0.4 mm×1.2 mm in size. The heaters and electrodes can be made of any conductive metal, for instance, gold (Au) or nickel-chromium (Ni—Cr).

The length of the waveguide arms 32 of the TMZ 10' determines the maximum temperature change in the TMZ 10', though the required power is almost independent of the device length because the heating area times the temperature change is substantially constant. In the preferred embodiment, the maximum temperature change is approximately 40° C.

The amount of loss introduced by each TMZ 10' can be controlled by controlling the electric current applied to the active thin film heater 34. It is known in the art with regard to TMZs, that the application of an electric current to a thin film heater causes the heater to heat the cladding material around the corresponding waveguide arm 32 so as to cause the refractive index in the waveguide arm 32 to change. As the refractive index of the waveguide arm 32 changes, a phase shift is introduced into the signal being carried by that waveguide arm 32. In the present case, where the TMZs 10' are operating as attenuators, it has been determined that a phase shift of 90° in the active arm introduces a loss of approximately 3 dB in the combined signal on waveguide 26. As another example, a phase shift of 120° in the active arm introduces a loss of approximately 6 dB in the combined signal on waveguide 26. Accordingly, by controlling the electric current applied to the active thin film heater 34, one can control the amount of attenuation introduced by the TMZ 10' on the output waveguide 24 so that the power level on the waveguides 26 can be equalized.

The phase difference $\phi$ between the two active arms 32 of the TMZ 10' that is caused by temperature difference is defined by Equation (1) below:

$$\phi = \frac{2\pi L \alpha \Delta T}{\lambda}, \tag{1}$$

where L is the length of the thin film heater 34, $\alpha$ is the refractive index thermal coefficient, $\Delta T$ is the temperature difference between the waveguide arms 32, and $\lambda$ is the optical wavelength. The throughput optical power P with a $\phi$ phase difference between the two arms 32 is defined by Equation (2) below:

$$P = [\cos(\phi/2)]^2 \tag{2}$$

Accordingly, by controlling the power applied to the active thin film heater 34, the amount of loss can be precisely controlled. In the preferred embodiment, a 3 dB loss can be achieved with approximately 0.25 watts applied to the active thin film heater 34. Further, a 6 dB loss can be achieved with approximately 0.38 watts applied to the active thin film heater 34. An advantage to the low power consumption of the TMZ 10' is that the heat sink is easier to make and less expensive, and the controller for the TMZ 10' is less expensive.

Yet a further feature of the present invention is that the TMZ 10' has a response time of approximately 1–10 milliseconds (ms) which is essentially real-time. However, the TMZ response time depends on the thickness of the waveguide layers and the thickness of the substrate 13. Generally, the faster the response of the attenuators 10, the smaller interrupt to the communication system. The TMZ response time in the present invention is close to the recovery or setup time of most optical communication systems, and is 10 therefore adequate for many applications. The thin film heaters 34 and electrodes 36, 38 are preferably fabricated using thermal or electron beam evaporation, as well known in the art. As an example, a layer of nickel-chromium (Ni—Cr) is initially deposited at a thickness of 100 angstroms (A). Next, a layer of gold (Au) is deposited to a thickness of 2500A. A single mask level can then be used to etch out the unwanted Au and Ni—Cr in order to form the thin film heaters 34 and the electrodes pads 36, 38.

It is noted at this point that other configurations of a thermo-optical Mach-Zehnder device such as a two port or three port (i.e., Y-branch or coupler) TMZ is equally suitable for employing as attenuators 10 of FIG. 1. Note that a Y-branch is more wavelength independent, but generally has more excess loss. With regards to the two port TMZ configuration, the input of a two port TMZ would be connected to the output waveguide 24 and the output of the two port TMZ would be connected to the corresponding waveguide 26. In virtually all other respects, the operation of a two port TMZ is substantially the same as described above with respect to a four port MTZ.

ALTERNATIVE EMBODIMENTS

While the preferred embodiment described above discloses the attenuators 10 implemented with TMZs, it is noted that other optical devices capable of attenuating the power levels at the output waveguides 24 may alternatively be incorporated as attenuators 10 of FIG. 1. It should be noted, however, that particular limitations exist upon such a device. For instance, the device must be small enough to be integrated with the DWDM 12, must have an attenuation range of about 6 dB, and should operate at low power (i.e., <0.6 W). Moreover, the device must be capable of being fabricated with the same or a compatible integrated circuit technique utilized to fabricate the DWDM 12. Other considerations include the fast response time and cost.

Figure 3:
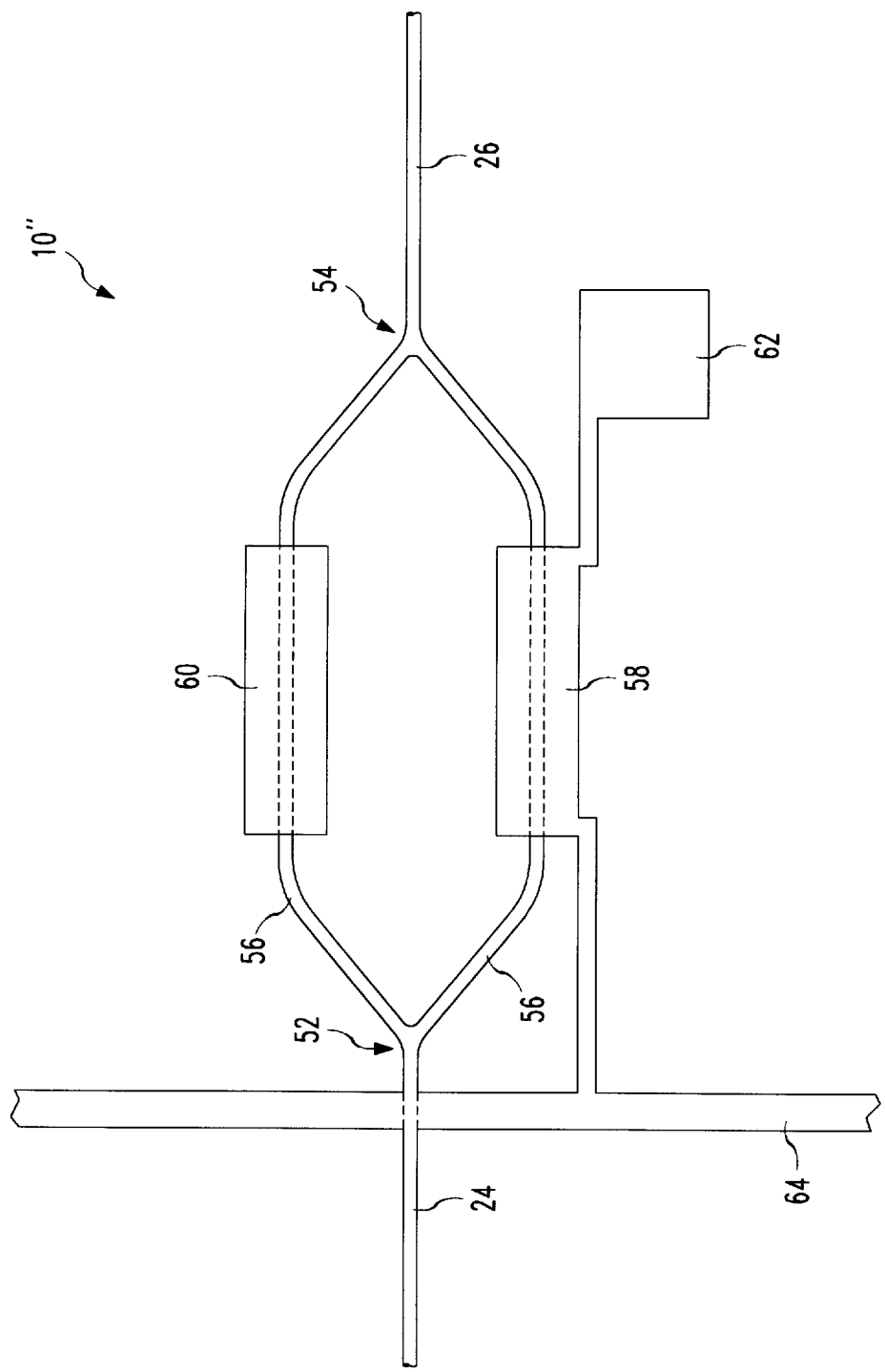
FIG. 3 is a top plan view of a variable stress Mach-Zehnder interferometer (VSMZ) for implementation as an alternative embodiment of the attenuators of FIG. 1.

Accordingly, an alternative embodiment of an attenuator for employing as the attenuators 10 in FIG. 1 is a variable stress Mach-Zehnder (VSMZ) 10", as illustrated in FIG. 3. Such a device is taught, for example, in U.S. Pat. No. 5,502,781, issued to the present inventor and Raymond Wolfe on Mar. 26, 1996, the disclosure of which is incorporated herein by reference.

With reference to FIG. 3, the VSMZ 10" comprises a first Y-junction 52 and a second Y-junction 54 interconnected by two waveguide arms 56 of equal length. Alternatively, the Y-junctions 52, 54 can be implemented with 3 dB couplers as would be recognized by one of ordinary skill in the art. The first Y-junction 52 is further connected to the output waveguide 24 of the DWDM 12. The second Y-junction is further connected to the corresponding waveguide 26. Transducers 58 and 60 are formed on the upper surface of the cladding of the respective waveguide arms 56. The transducers 58, 60 are thin layers of piezo-electric material, such as lead magnesium niobate or lead zirconate titanate, that are preferably applied via sputtering and etching. When an electric current is applied across the transducer 58, 60, regions of stress are created that either increase or decrease the refractive index of the associated waveguide arm 56, depending upon whether the stress if compressive or tensile. Thus, the amount of applied stress and the resulting change in the refractive index can be selectively controlled by the application of a varied electric current to the transducer 58, 60. As with the TMZ 10', transducers 58, 60 are placed over both waveguide arms 56 in order to cancel the stress caused by their presence, though only one transducer (e.g., transducer 56) is designated as active while the other transducer (e.g., transducer 60) is designated as inactive. Attached to the active transducer 56 are electrodes 62 and 64. Each VSMZ 10" has its own first electrode 62 for selectively actuating the respective VSMZ 10" that is utilized to implement the attenuator 10 (FIG. 1). The electrode 64, on the other hand, is a common electrode shared by all the VSMZs 10".

In this configuration, when an electric field is applied to the active transducer 58 associated with the active waveguide arm 56, the refractive index, and thus the optical path length, of the corresponding waveguide is changed, thereby causing a phase difference between the two arms 56. Where the two arms come together and the signals combine at the second Y-junction 56, the phase difference produces an attenuation in the power on the waveguide 26. Thus, by controlling the amount of electric field applied to the active transducer 58, the amount of attenuation can be selectively controlled.

Other similar stress applying materials that can be affixed to the upper surface of the cladding of the waveguides forming the waveguide arms and that are capable of applying stress to the waveguides in order to change the index of refraction of the waveguide are described in U.S. Pat. No. 5,502,781, cited above.

In concluding the detailed description, it should be noted that it will be obvious to those skilled in the art that many variations and modifications may be made to the preferred embodiment without substantially departing from the principals of the present invention. Also the variations and modifications are intended to be included herein within the scope of the present invention, as set forth in the following claims. Further, the claims hereafter, the corresponding structures, materials, acts and equivalents of all means or step plus function elements are intended to include any structure, material, or acts for performing the functions in combination with other claimed elements as specifically claimed.

Wherefore the following is claimed:

1. An integrated optical waveguide device, comprising:
    an optical branching device fabricated on a substrate and having a plurality of ports; and
    an attenuator integrated with said optical branching device on said substrate and connected to a first one of said ports, said attenuator being substantially tunable over a continuum ranging from optical transparency to optical opaqueness;
    controlling means for adjusting an attenuation applied to an optical signal on said first one of said ports by said attenuator, said controlling means being responsive to a power level of said optical signal and
    said attenuator being responsive to an attenuation adjustment signal from said controlling means in real time.

2. The waveguide device of claim 1, wherein said optical branching device is a dense waveguide division multiplexer having a plurality of interconnected input and output waveguides.

3. The waveguide device of claim 2, wherein said tunable attenuator comprises a thermo-optic Mach-Zehnder interferometer.

4. The waveguide device of claim 3, wherein said thermo-optic Mach-Zehnder interferometer includes a first optical coupler and a second optical coupler linked by two waveguide arms, and a heater associated with at least one of said waveguide arms.

5. The waveguide device of claim 4, wherein said thermo-optic Mach-Zehnder interferometer includes an electrode adjacent each of said optical couplers and connected to said heater for actuating said heater, and wherein said electrodes and said heater are formed from a same layer of conductive material.

6. The waveguide device of claim 3, wherein said thermo-optic Mach-Zehnder interferometer includes first and second input waveguides and first and second output waveguides, and wherein said first output waveguide of said dense waveguide division multiplexer is connected to said first input waveguide of said interferometer, and wherein said attenuated optical signal is provided on said first output waveguide of said thermo-optic Mach-Zehnder interferometer.

7. The waveguide device of claim 2, wherein said tunable attenuator comprises a variable stress Mach-Zehnder interferometer.

8. The waveguide device of claim 7, wherein said variable stress Mach-Zehnder interferometer includes a layer of piezo-electric material that is actuated by two electrodes and is positioned adjacent to one of said output waveguides.

9. The waveguide device of claim 2, further comprising:
a plurality of attenuators integrated with said dense waveguide division multiplexer on said substrate and connected to respective said output waveguides, said attenuators being substantially tunable over a continuum ranging from optical transparency to optical opaqueness and being responsive to an attenuation adjustment signal from said controlling means in real time; and
said controlling means adjusting an attenuation applied to an optical signal on each said output waveguide, said controlling means being responsive to a power level of each said optical signal.

10. The waveguide device of claim 2, wherein said tunable attenuator has a tunable attenuation range of 6 dB.

11. The waveguide device of claim 2, wherein said tunable attenuator comprises two Y-branches interconnected by two waveguide arms and a beater associated with at least one of said waveguide arms.

12. An integrated optical waveguide device, comprising:
a dense waveguide division multiplexer having a plurality of interconnected input and output waveguides, said output waveguides having respective optical signals of different strengths; and
a plurality of thermo-optic Mach-Zehnder interferometers having first and second waveguides interfacing at first and second coupler regions, wherein said output waveguides of said dense waveguide division multiplexer are connected to respective said thermo-optic Mach-Zehnder interferometers, each said thermo-optic Mach-Zehnder interferometer configured for selectively and controllably attenuating said respective optical signal of each said output waveguide of said dense waveguide division multiplexer so as to substantially equalize said optical signal strengths.

13. The device of claim 12, wherein at least one of said thermo-optic Mach-Zehnder interferometers comprises four ports.

14. The device of claim 12, wherein at least one of said thermo-optic Mach-Zehnder interferometers comprises two ports.

15. A method of fabricating a dense waveguide division multiplexer having a plurality of input and output waveguides so that the power of the optical signals at the output waveguides are substantially equal, comprising the steps of:
fabricating said dense waveguide division multiplexer on a silicon-based substrate;
fabricating a plurality of attenuators on said substrate adjacent to said dense waveguide division multiplexer, wherein each said attenuator is connected to a respective one of said waveguide outputs of said dense waveguide division multiplexer, said attenuators being substantially tunable over a continuum ranging from optical transparency to optical opaqueness and being responsive to an attenuation adjustment signal from controlling means in real time.

16. The method of claim 15, wherein said tunable attenuators comprise thermo-optic Mach-Zehnder interferometers.

17. The method of claim 15, wherein said tunable attenuators comprise variable stress Mach-Zehnder interferometers.

* * * * *